United States Patent
Feng

(10) Patent No.: US 11,032,861 B2
(45) Date of Patent: Jun. 8, 2021

(54) DEVICE TO DEVICE-BASED COMMUNICATION METHOD AND TERMINAL

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/925,200

(22) Filed: Jul. 9, 2020

(65) Prior Publication Data

US 2020/0344829 A1 Oct. 29, 2020

Related U.S. Application Data

(63) Continuation of application No. 16/543,449, filed on Aug. 16, 2019, which is a continuation of application
(Continued)

(51) Int. Cl.
*H04W 76/14* (2018.01)
*H04W 40/10* (2009.01)
(Continued)

(52) U.S. Cl.
CPC ......... *H04W 76/14* (2018.02); *H04W 8/005* (2013.01); *H04W 40/10* (2013.01); *H04W 40/24* (2013.01); *H04W 88/04* (2013.01); *H04W 92/18* (2013.01)

(58) Field of Classification Search
CPC ..... H04W 76/14; H04W 8/005; H04W 92/18; H04W 88/04; H04W 40/24; H04W 40/10
See application file for complete search history.

(56) References Cited

U.S. PATENT DOCUMENTS 10,057,352 B2 * 8/2018 Gupta .................... H04W 4/70
2013/0159522 A1 6/2013 Hakola
(Continued)

FOREIGN PATENT DOCUMENTS

CN 102355728 A 2/2012
CN 104105155 A 10/2014
(Continued)

OTHER PUBLICATIONS

International Search Report in the international application No. PCT/CN2016/076806, dated Nov. 30, 2016.
(Continued)

*Primary Examiner* — Keith Ferguson
(74) *Attorney, Agent, or Firm* — Ladas & Parry, LLP

(57) ABSTRACT

Provided in the embodiment of the present invention are a D2D-based communication method and a terminal. The method comprises: a first terminal receives a discovery signal of a second terminal, the discovery signal comprising indication information for indicating the capability and/or the status of the second terminal; and the first terminal performs D2D communication with the second terminal on the basis of the instruction information. The embodiment of the present invention implements the D2D communication on the basis of the capability and/or status of the terminal, improving the flexibility of the D2D communication mode.

19 Claims, 5 Drawing Sheets

Related U.S. Application Data

No. 15/779,035, filed as application No. PCT/CN2016/076806 on Mar. 18, 2016, now Pat. No. 10,433,356.

(51) Int. Cl.
  *H04W 40/24* (2009.01)
  *H04W 8/00* (2009.01)
  *H04W 88/04* (2009.01)
  *H04W 92/18* (2009.01)

(56) References Cited

U.S. PATENT DOCUMENTS

| | | | |
|---|---|---|---|
| 2015/0173029 | A1 | 6/2015 | Fujishiro |
| 2015/0215903 | A1 | 7/2015 | Zhao et al. |
| 2016/0007383 | A1 | 1/2016 | Chae et al. |
| 2016/0065538 | A1 | 3/2016 | Hakola et al. |
| 2016/0143002 | A1 | 5/2016 | Lindoff et al. |
| 2016/0150390 | A1 | 5/2016 | Chen et al. |
| 2016/0204847 | A1 | 7/2016 | Ryu et al. |
| 2016/0212108 | A1 | 7/2016 | Stojanovski et al. |
| 2016/0286375 | A1 | 9/2016 | Fujishiro |

FOREIGN PATENT DOCUMENTS

| | | |
|---|---|---|
| CN | 104854916 A | 8/2015 |
| CN | 105009538 A | 10/2015 |
| CN | 105246027 A | 1/2016 |
| CN | 105338639 A | 2/2016 |
| CN | 105357711 A | 2/2016 |
| EP | 2892287 A1 | 7/2015 |
| EP | 2983426 A1 | 2/2016 |
| JP | 2000308146 A | 11/2000 |
| JP | 2004135258 A | 4/2004 |
| JP | 2015035712 A | 2/2015 |
| JP | 2016528824 A | 9/2016 |
| WO | 2014161383 A1 | 10/2014 |
| WO | 2015017187 A1 | 2/2015 |
| WO | 2015112259 A1 | 7/2015 |
| WO | 2015167747 A1 | 11/2015 |
| WO | 2015169768 A1 | 11/2015 |
| WO | 2016015664 A1 | 2/2016 |
| WO | 2016019620 A1 | 2/2016 |

OTHER PUBLICATIONS

Written Opinion of the International Search Authority in the international application No. PCT/CN2016/076806, dated Nov. 30, 2016.
Supplementary European Search Report in the European application No. 16893954.4, dated Apr. 23, 2019.
First Office Action of the Japanese application No. 2018-532234, dated Dec. 3, 2019, drafted on Nov. 28, 2019.
Office Action of the Indian application No. 201817027957, dated May 4, 2020.
First Office Action of the European application No. 16893954.4, dated May 6, 2020.
Non-Final Office Action of the U.S. Appl. No. 15/779,035, dated Dec. 7, 2018.
Non-Final Office Action of the U.S. Appl. No. 16/543,449, dated Sep. 19, 2019.
Final Office Action of the U.S. Appl. No. 16/543,449, dated Jan. 28, 2020.
3GPP TSG-RAN WG2 Meeting #92 R2-156703 Anaheim, USA, Nov. 16-20, 2015; Report of email discussion [91bis#27][LTE/eD2D] UE-to NW relays (Qualcomm), pp. 1-13.
3GPP TS 36.331 V13.0.0 (Dec. 2015); 3rd Generation Partnership Project; Technical Specification Group Radio Access Network; Evolved Universal Terrestrial Radio Access (E-UTRA); Radio Resource Control (RRC); Protocol specification (Release 13), pp. 1-507.
First Office Action of the Chinese application No. 201680078509.5, dated Aug. 11, 2020, with search report.
Office Action of the Taiwanese application No. 106109056, dated Jul. 2, 2020.
Notice of Rejection of the Japanese application No. 2018-532234, dated Jul. 7, 2020.
Notice of Allowance of the U.S. Appl. No. 16/543,449, dated Jul. 30, 2020.
Notice of Allowance of the U.S. Appl. No. 16/543,449, dated Apr. 7, 2020.
Second Office Action of the Chinese application No. 201680078509.5, dated Mar. 29, 2021.
Second Office Action of the European application No. 16893954.4, dated Mar. 31, 2021.

\* cited by examiner

DEVICE TO DEVICE-BASED COMMUNICATION METHOD AND TERMINAL

CROSS-REFERENCE TO RELATED APPLICATIONS

This application is a continuation of U.S. application Ser. No. 16/543,449, filed on Aug. 16, 2019, which is a continuation of U.S. application Ser. No. 15/779,035, filed on May 24, 2018, which is a US national phase application based upon International Application No. PCT/CN2016/076806, filed on Mar. 18, 2016. The entire contents of the above applications are incorporated herein by reference in their entireties.

TECHNICAL FIELD

Embodiments of the disclosure relate to the field of wireless communication, and more particularly to a Device to Device (D2D)-based communication method and a terminal.

BACKGROUND

Conventional mobile communication usually adopts a cellular-network-based communication manner. Specifically, in a cellular network, when a source terminal is to transmit data to a target terminal, the source terminal is to establish a connection with a base station at first, and then the data of the source terminal is sent to the target terminal through the base station.

Long Term Evolution (LTE) Release 12 (R12) introduces a D2D communication technology, also called as a D2D technology. In the D2D communication technology, a terminal may directly communicate with another terminal by virtue of a resource allocated by a base station.

The whole D2D process may substantially be divided into a D2D discovery process and a D2D communication process, wherein, in the D2D discovery process, a D2D terminal may detect a discovery signal broadcast by another D2D terminal, thereby detecting existence of the other D2D terminal in a short-distance range and recognizing identity information of the other D2D terminal. In the D2D communication process, the D2D terminals may perform data exchange in multiple forms of voice communication, multimedia information sharing or the like at a short distance.

LTE R13 introduces a D2D cooperative relay communication technology. By virtue of the D2D cooperative relay communication technology, when a terminal is located in an environment without network coverage or network coverage of the terminal is poorer, the terminal may access a base station (or access a network) by taking another terminal located in the network coverage as an access board. The terminal taken as the access board may be called as a relay terminal or a relay node.

In a future wireless communication system, besides conventional terminals, there may appear more and more terminals of other types, for example, a smart band, a wireless television, smart glasses, a robot and a watch, and the terminals of these special types are lower in cost, may not have a function of directly accessing a base station and usually require relay terminals for accessing the base station. The terminals of these special types may support different bandwidths and transmit power. In addition, in a D2D cooperative relay communication technology, different relay terminals may be in different states. For example, a relay terminal of which electricity amount or load reaches a certain threshold value may not provide access service for a new terminal.

However, in a conventional art, terminals perform D2D discovery and D2D communication according to a unified manner and may not make regulations according to practical conditions of the terminals, so that such a communication manner is not so flexible.

BRIEF DESCRIPTION OF DRAWINGS

In order to describe the technical solutions of the embodiments of the disclosure more clearly, the drawings required to be used in the embodiments of the disclosure will be simply introduced below. Obviously, the drawings described below are only some embodiments of the disclosure. Other drawings may further be obtained by those of ordinary skilled in the art according to these drawings without creative work.

DETAILED DESCRIPTION

Figure 1:
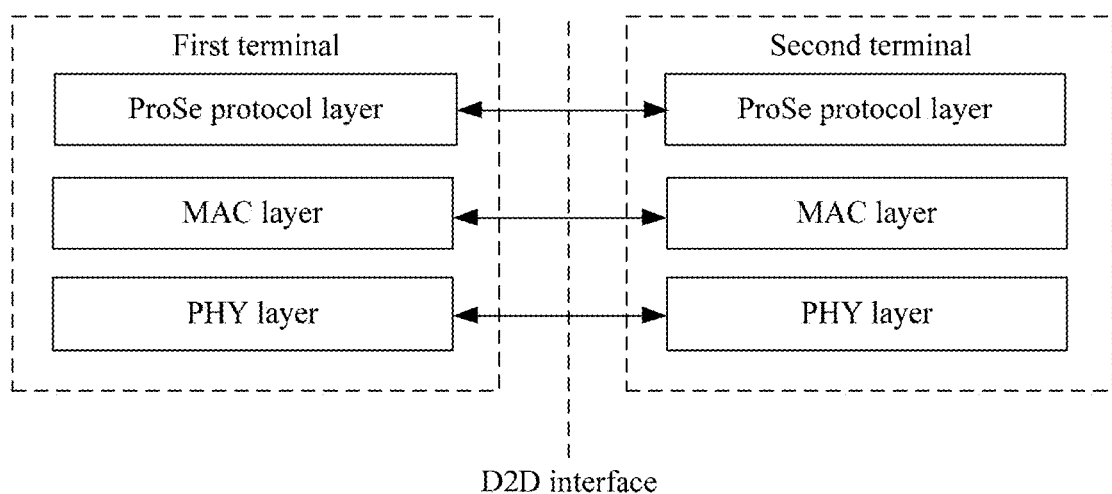
FIG. 1 is a schematic diagram of a protocol stack format of a discovery signal.

It should be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an Advanced LTE (LTE-A) system, a Universal Mobile Telecommunication System (UMTS) and 5th-Generation.

It should also be understood that, in the embodiments of the disclosure, a terminal may be a mobile terminal, and includes, but not limited to, User Equipment (UE), a Mobile Station (MS), a mobile telephone, a handset, portable equipment and the like. The UE may communicate with one or more core networks through a Radio Access Network (RAN). For example, the UE may be a mobile telephone (or called as a "cellular" telephone) and a computer with a wireless communication function, and the UE may also be a portable, pocket, handheld, computer-built-in or vehicle-mounted mobile device. In addition, the terminal of the embodiments of the disclosure may further be a terminal of another type, besides a conventional handheld terminal, including a smart band, a wireless television, smart glasses, a robot, a watch and the like.

In the embodiments of the disclosure, a base station may be a Base Transceiver Station (BTS) in the GSM or CDMA, may also be a NodeB in WCDMA, may further be an Evolved Node B (eNB or e-NodeB) in LTE, and may further be an access point with an access function with a 5G communication network, which will not be limited in the embodiments of the disclosure.

From the above, it can be seen that, in a future wireless communication system, besides conventional terminals, there may appear more and more terminals of other types, and terminals of different types may have different capabilities or states. Therefore, before performing D2D communication, a terminal may make another terminal to know about its own capability or state in a certain manner, for example, making the other terminal to know about whether the terminal is a low-cost and small-bandwidth terminal, maximum transmit power, electricity amount and load of the terminal and whether the terminal may receive data, for the other terminal to perform D2D communication with the terminal by adopting a proper communication mode.

Before D2D communication, a terminal expecting to initiate D2D communication may send a discovery signal to terminals around it. In some embodiments, indication information may be contained in the discovery signal of the terminal, and the indication information may be configured to indicate a capability or state of the terminal.

A capability of a terminal may, for example, include at least one of: a bandwidth supported by the terminal; transmit power of the terminal; whether the terminal may serve to enable another terminal to access a base station as a relay terminal; and a type of a service for which the terminal allows access of the other terminal as the relay terminal and/or a priority (or probability) of the service for which access of the other terminal is allowed. A state of a terminal may, for example, include at least one of: a load of the terminal and electricity amount of the terminal.

The application provides a D2D-based communication method and a terminal, so as to improve flexibility of a D2D communication manner.

Embodiments of the disclosure provide a D2D-based communication method. The method may include the following actions. A first terminal receives a discovery signal of a second terminal. The discovery signal includes indication information and the indication information is configured to indicate at least one of a capability of the second terminal or a state of the second terminal. The first terminal performs D2D communication with the second terminal according to the indication information.

According to an embodiment, the second terminal may be a relay terminal. The second terminal may access a base station through the first terminal. The indication information may be configured to indicate the capability of the second terminal. The action of performing, by the first terminal, D2D communication with the second terminal according to the indication information may include the following actions. The first terminal determines a communication manner matched with the capability, indicated by the indication information, of the second terminal according to the indication information. During the second terminal accessing the base station through the first terminal, the first terminal performs D2D communication with the second terminal in the communication manner.

According to an embodiment, the indication information may be configured to indicate a capability level of the second terminal. The capability level of the second terminal may be one of multiple preset capability levels. The action of determining, by the first terminal, the communication manner matched with the capability of the second terminal according to the indication information may include the following actions. The first terminal determines the capability level of the second terminal according to the indication information. The first terminal determines the capability of the second terminal through a preset correspondence between capability levels and capabilities of a terminal according to the capability level of the second terminal. The first terminal determines the communication manner matched with the capability of the second terminal.

According to an embodiment, the capability of the second terminal may include at least one of a bandwidth supported by the second terminal and transmit power of the second terminal.

According to an embodiment, the first terminal may access the base station through the second terminal. The indication information may be configured to indicate the state of the second terminal. The action of performing, by the first terminal, D2D communication with the second terminal according to the indication information may include the following actions. The first terminal determines the state of the second terminal according to the indication information. The first terminal determines whether the base station may be accessed through the second terminal according to the state of the second terminal. When the first terminal determines that the base station may be accessed through the second terminal, the first terminal performs D2D communication with the second terminal to access the base station.

According to an embodiment, the indication information may be configured to indicate a state level of the second terminal. The state level of the second terminal may be one of multiple preset state levels. The action of determining, by the first terminal, the state of the second terminal according to the indication information may include the following actions. The first terminal determines the state level of the second terminal according to the indication information. The first terminal determines the state of the second terminal through a preset correspondence between state levels and states of a terminal according to the state level of the second terminal.

According to an embodiment, the indication information may be configured to indicate whether the second terminal allows another terminal to access the base station through the second terminal.

According to an embodiment, the action of determining, by the first terminal, the state of the second terminal according to the indication information may include the following actions. The first terminal determines a service type set or terminal set for which the second terminal allows one or more terminals other than the second terminal to access the base station through the second terminal according to the indication information. The action of determining, by the first terminal, whether the base station may be accessed through the second terminal according to the state of the second terminal may include the following actions. The second terminal sends the indication information in the discovery signal to indicate the service type set or terminal set allowed for access. The first terminal determines whether a service type of a present service of the first terminal belongs to the service type set or whether the first terminal belongs to the terminal set. When the service type of the present service belongs to the service type set or the first terminal belongs to the terminal set, the first terminal determines that the base station may be accessed through the second terminal. When the service type of the present service does not belong to the service type set or the first terminal does not belong to the terminal set, the first terminal determines that the base station may not be accessed through the second terminal.

According to an embodiment, the state of the second terminal may refer to the service type set for which the second terminal may provide access. Or, the state of the second terminal may refer to the terminal set for which the second terminal may provide access.

According to an embodiment, the action of determining, by the first terminal, the state of the second terminal according to the indication information may include the following actions. The first terminal determines an access probability of the present service of the first terminal or a terminal category of the first terminal. The action of determining, by the first terminal, whether the base station may be accessed through the second terminal according to the state of the second terminal may include the following actions. The first terminal generates a random number and calculates a probability of the random number. When the probability of the random number meets the access probability, the first terminal determines that the base station may be accessed through the second terminal. When the probability of the random number does not meet the access probability, the first terminal determines that the base station may not be accessed through the second terminal.

According to an embodiment, the state of the second terminal may include electricity amount or load of the second terminal. The action of determining, by the first terminal, the state of the second terminal according to the indication information may include the following actions. The first terminal determines the electricity amount or load of the second terminal according to the indication information. The action of determining, by the first terminal, whether the base station may be accessed through the second terminal according to the state of the second terminal may include the following actions. When the electricity amount is larger than a preset electricity amount threshold value or the load of the second terminal is larger than a preset load threshold value, the first terminal determines that the base station may be accessed through the second terminal. When the electricity amount of the second terminal is smaller than the electricity amount threshold value or the load of the second terminal is smaller than the load threshold value, the first terminal determines that the base station may not be accessed through the second terminal.

According to an embodiment, the state of the second terminal may include at least one of the electricity amount of the second terminal and the load of the second terminal.

According to an embodiment, the indication information may be included in Downlink Control Information (DCI) of a Physical (PHY) layer of the discovery layer.

According to an embodiment, the indication information may be included in a Media Access Control (MAC) Control Element (CE) of the discovery signal.

According to an embodiment, the indication information may be included in a Proximity-based Service (ProSe) protocol layer of the discovery signal.

According to the application, D2D communication is performed on the basis of at least one of a capability or state of a terminal, so that flexibility of a D2D communication manner is improved.

FIG. 1 is a schematic diagram of a protocol stack format of a discovery signal. A protocol stack of the discovery signal may include a ProSe protocol layer (or called as an upper layer), a MAC layer and a PHY layer. ProSe may represent Proximity Service, i.e., proximity service, the ProSe protocol layer may include a ProSe identifier of a terminal, and terminals may be mutually recognized through ProSe identifiers and perform D2D communication.

In some embodiments, indication information may be located in the PHY layer of the indication information, and for example, may be included in DCI of the PHY layer. In an example, the terminal may indicate a capability or state of the terminal through an information field in a DCI format of the PHY layer of the discovery signal.

In some embodiments, the indication information may be located in the MAC layer of the discovery signal, and for example, may be included in a CE of the MAC layer. In an example, the terminal may indicate the capability or state of the terminal through a bit or index in the MAC CE of the discovery signal.

In some embodiments, the indication information may be located in the ProSe protocol layer of the discovery signal. In an example, the terminal may indicate the capability or state of the terminal through an information field in the ProSe protocol layer of the discovery signal.

According to the embodiments of the disclosure, an indication manner for the indication information is not specifically limited, a direct indication manner may be adopted, and an indirect indirection manner may also be adopted. In some embodiments, the capability or state of the terminal may be divided into a plurality of levels in advance, different capability levels may correspond to different capabilities of the terminal, and different state levels may correspond to different states of the terminal. The indication information specifically includes capability level information and/or state level information. A capability level or state level-based indication manner may reduce an overhead in the indication information.

For example, the capability of the terminal may include a bandwidth supported by the terminal and a maximum bandwidth supported by the terminal. Bandwidth levels of the terminal may be divided in advance, and for example, the bandwidth levels of the terminal may be divided into multiple levels of 200 kHz, 1.4 MHz, 5 MHz and the like.

For another example, the capability of the terminal may support transmit power (for example, maximum transmit power and average transmit power) supported by the terminal. transmit power levels of the terminal may be divided in advance, and for example, the transmit power levels of the terminal may be divided into levels of 20 dBm, 23 dBm and the like.

For another example, the state of the terminal may include electricity amount of the terminal. Electricity amount levels of the terminal may be divided in advance, and for example, the electricity amount levels of the terminal may be divided into levels of 20%, 50%, 80% and the like. Of course, the state of the terminal may also be another state of a load of the terminal and the like, and a specific division principle is similar and will not be elaborated herein.

The embodiments of the disclosure will be described below with a D2D cooperative relay communication technology as an example in detail.

Figure 2:
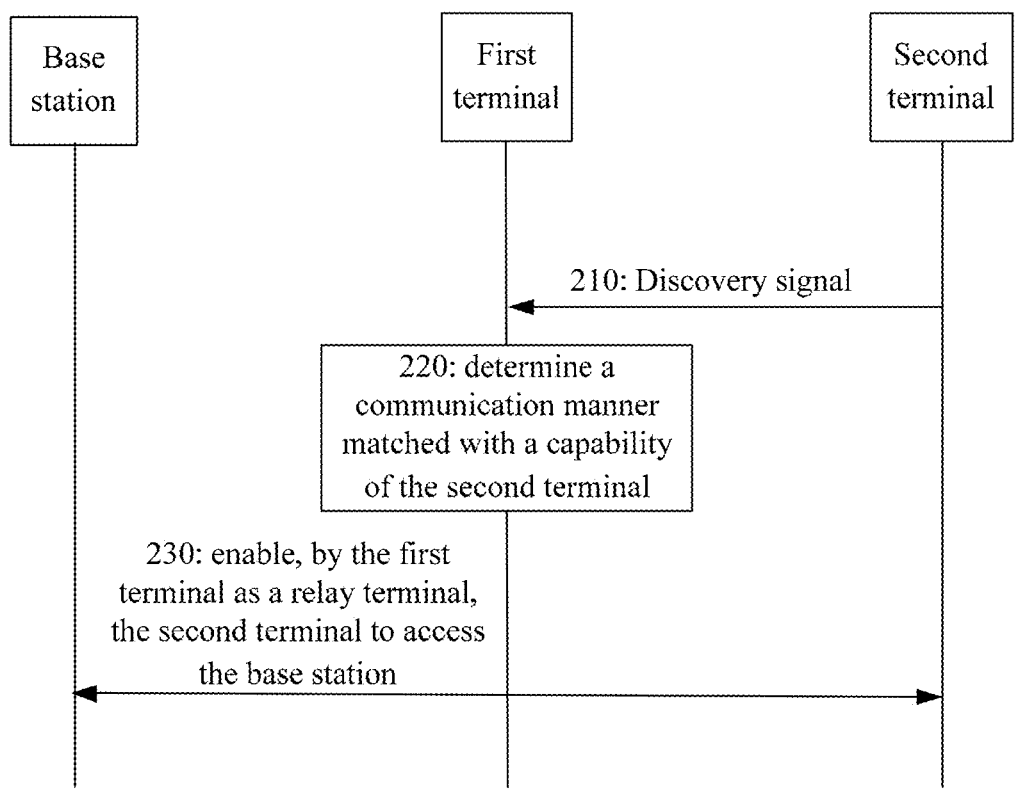
FIG. 2 is a schematic flowchart of a D2D-based communication method according to an embodiment of the disclosure.

FIG. 2 is a schematic flowchart of a D2D-based communication method according to an embodiment of the disclosure. In FIG. 2, a first terminal is a relay terminal, and a second terminal expects to access a base station through the first terminal. It should be understood that communication actions or operations shown in FIG. 2 are only exemplary, and other operations or transformations of various operations in FIG. 2 may also be executed in the embodiment of the disclosure. In addition, each action in FIG. 2 may be executed according to a sequence different from that presented in FIG. 2 and there is a probability that not all the operations in FIG. 2 are required to be executed.

In 210, the second terminal sends a discovery signal.

In some embodiments, when the second terminal expects to initiate D2D communication or the second terminal expects to access the base station through another terminal, the discovery signal may be broadcast. In an example, the second terminal may be a terminal without network coverage or a low-cost or small-bandwidth terminal incapable of directly accessing the base station.

In addition, the discovery signal of the second terminal may contain indication information, and the indication information may be configured to indicate a capability of the second terminal. The capability of the terminal and a containing manner for the indication information in the discovery signal are described above in detail and will not be elaborated herein to avoid repetitions.

In 220, the first terminal determines a communication manner matched with a capability of the second terminal.

For example, the second terminal supports a bandwidth of 200 kHz and transmit power of 20 dBm. The first terminal may select a corresponding bandwidth resource and transmit power to communicate with the second terminal.

In 230, the first terminal enables the second terminal to access the base station as a relay terminal.

during the second terminal accessing the base station through the first terminal, the first terminal performs D2D communication with the second terminal in the communication manner determined in Action 220.

In the embodiment of the disclosure, the first terminal may determine a proper communication manner on the basis of the capability of the second terminal and enable the second terminal to access the base station according to the communication manner, so that flexibility of D2D cooperative relay communication is improved.

Figure 3:
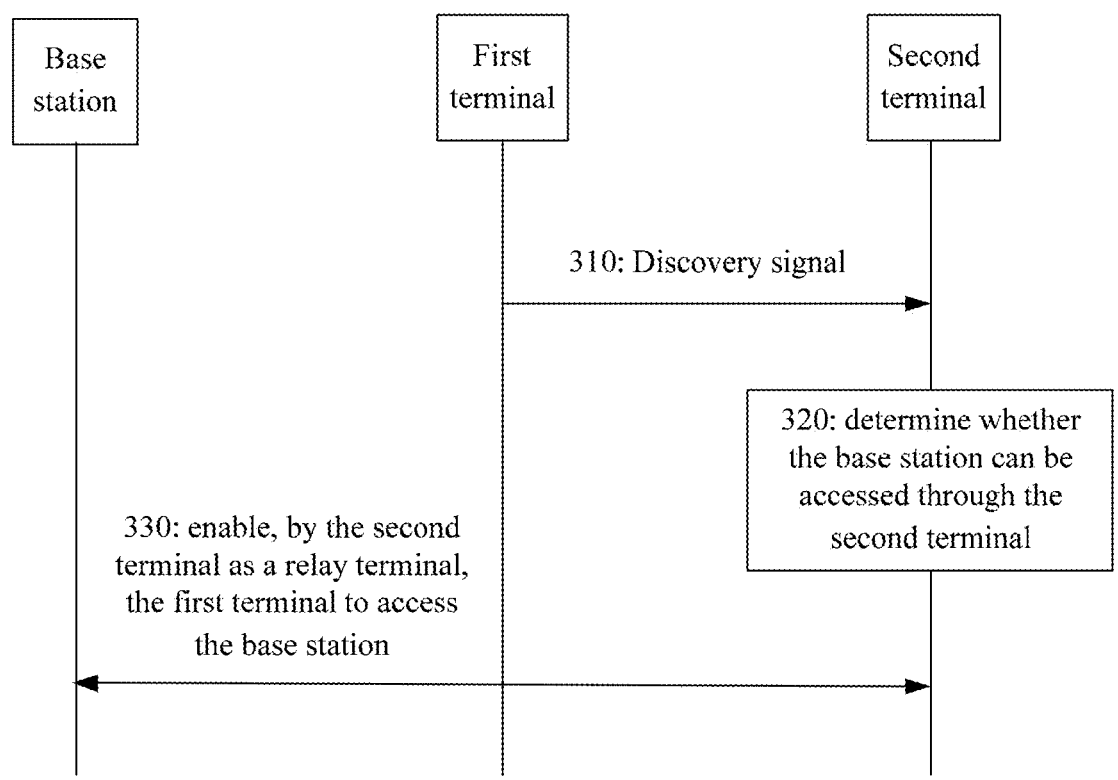
FIG. 3 is a schematic flowchart of a D2D-based communication method according to an embodiment of the disclosure.

FIG. 3 is a schematic flowchart of a D2D-based communication method according to an embodiment of the disclosure. In FIG. 3, a second terminal is a relay terminal, and a first terminal expects to access a base station through the second terminal. It should be understood that communication actions or operations shown in FIG. 3 are only exemplary, and other operations or transformations of various operations in FIG. 3 may also be executed in the embodiment of the disclosure. In addition, each action in FIG. 3 may be executed according to a sequence different from that presented in FIG. 3 and there is a probability that not all the operations in FIG. 3 are required to be executed.

In 310, the second terminal sends a discovery signal.

The discovery signal of the second terminal may contain indication information, and the indication information may be configured to indicate a state of the second terminal. For example, present electricity amount and load of the second terminal may be contained.

In 320, the first terminal determines whether the base station may be accessed through the second terminal.

In some embodiments, the indication information may be the electricity amount or load of the second terminal, and at this moment, the second terminal may select to perform access and data transmission through the second terminal according to a preconfigured threshold value. For example, for the electricity amount of the second terminal, the threshold value may be set to be 30% of the electricity amount of the second terminal, and when the indication information indicates that the electricity amount of the second terminal is 20%, the first terminal does not access the base station through the second terminal; and when the indication information indicates that the electricity amount of the second terminal is 40%, the first terminal accesses the base station through the second terminal.

In some embodiments, the indication information may indicate whether the second terminal allows another terminal to access the base station through the second terminal; and/or a type of a service for which the second terminal allows the other terminal to access the base station through the second terminal and/or an access probability (or priority) of the service. In an example, it may be indicated in the indication information (the indication information may perform indication through, for example, a certain information field of the discovery signal, namely through an information bit in the information field) that the second terminal may provide access for a service 1 and a service 2 and may not provide access for a service 3. When a present service (service expected to access the base station) of the first terminal is the service 1, the first terminal accesses the base station through the second terminal, and when the present service of the first terminal is the service 3, the first terminal does not access the base station through the second terminal. In another example, it may be indicated in the indication information (the indication information may perform indication through, for example, a certain information field of the discovery signal, namely through an information bit in the information field) that an access probability of the service 1 is 80% and an access probability of the service 2 is 30%. When the present service (expected to access the base station) of the first terminal is the service 1, the indication information indicates that the access probability of the service 1 is 80%, and then the first terminal may generate a random number between 0 and 1, and when a probability of the random number is lower than 80% (namely falling between 0 and 0.8), the first terminal accesses the base station through the second terminal, otherwise the first terminal does not access the base station through the second terminal.

In 330, when determining that the second terminal may provide access service, the first terminal accesses the base station through the second terminal.

The D2D-based communication method according to the embodiments of the disclosure is described above in combination with FIG. 1 to FIG. 3 in detail, and a terminal according to the embodiments of the disclosure will be described below in combination with FIG. 4 to FIG. 5 in detail. It should be understood that the terminal of FIG. 4 or FIG. 5 may execute each action executed by the terminal above, and repeated descriptions are properly eliminated for simplicity.

Figure 4:
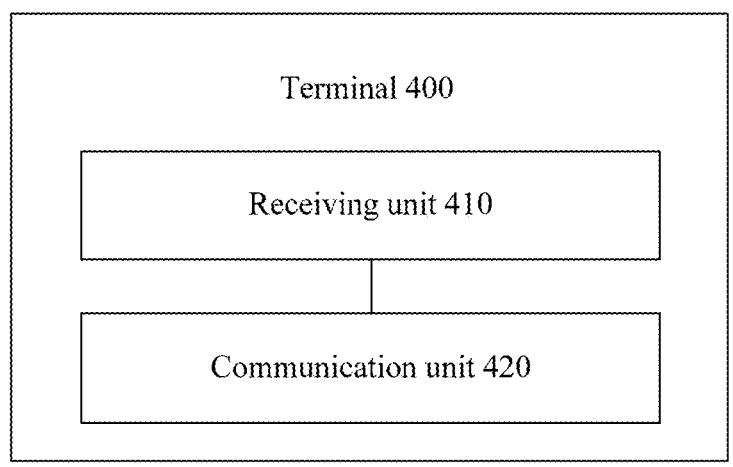
FIG. 4 is a schematic structure diagram of a terminal according to an embodiment of the disclosure.

FIG. 4 is a schematic structure diagram of a terminal according to an embodiment of the disclosure. The terminal 400 of FIG. 4 includes:

a receiving unit 410, configured to receive a discovery signal of a second terminal, the discovery signal including indication information and the indication information being configured to indicate a capability of the second terminal and/or a state of the second terminal; and a communication unit 420, configured to perform D2D communication with the second terminal according to the indication information.

According to the embodiment of the disclosure, D2D communication is performed on the basis of a capability and/or state of a terminal, so that flexibility of a D2D communication manner is improved.

In at least one embodiment, the second terminal accesses a base station through a first terminal, the indication information is configured to indicate the capability of the second terminal, and the communication unit 420 is specifically configured to determine a communication manner matched with the capability of the second terminal according to the indication information and, during the second terminal accessing the base station through the first terminal, perform D2D communication with the second terminal in the communication manner.

In at least one embodiment, the indication information is specifically configured to indicate a capability level of the second terminal, the capability level of the second terminal is one of multiple preset capability levels, and the communication unit 420 is specifically configured to determine the capability level of the second terminal according to the indication information, determine the capability of the second terminal through a preset correspondence between capability levels and capabilities of a terminal according to the capability level of the second terminal and determine the communication manner matched with the capability of the second terminal.

In at least one embodiment, the capability of the second terminal includes at least one of a bandwidth supported by the second terminal and transmit power of the second terminal.

In at least one embodiment, the first terminal accesses the base station through the second terminal, the indication information is configured to indicate the state of the second terminal, and the communication unit 420 is specifically configured to determine the state of the second terminal according to the indication information, determine whether the base station may be accessed through the second terminal according to the state of the second terminal and, responsive to a determination about that the base station may be accessed through the second terminal, perform, by the first terminal, D2D communication with the second terminal to access the base station.

In at least one embodiment, the indication information is specifically configured to indicate a state level of the second terminal, the state level of the second terminal is one of multiple preset state levels, and the communication unit 420 is specifically configured to determine the state level of the second terminal according to the indication information and determine the state of the second terminal through a preset correspondence between state levels and states of a terminal according to the state level of the second terminal.

In at least one embodiment, the indication information is specifically configured to indicate whether the second terminal allows another terminal to access the base station through the second terminal.

In at least one embodiment, the communication unit 420 is specifically configured to: determine a service type set or terminal set for which the second terminal allows the other terminal to access the base station through the second terminal according to the indication information; determine whether a service type of a present service of the first terminal belongs to the service type set or whether the first terminal belongs to the terminal set; when the service type of the present service belongs to the service type set or the first terminal belongs to the terminal set, determine that the base station may be accessed through the second terminal; and when the service type of the present service does not belong to the service type set or the first terminal does not belong to the terminal set, determine that the base station may not be accessed through the second terminal.

In at least one embodiment, the communication unit 420 is specifically configured to: determine an access probability of the present service of the first terminal or a terminal category of the first terminal; generate a random number and calculate a probability of the random number; when the probability of the random number meets the access probability, determine that the base station may be accessed through the second terminal; and when the probability of the random number does not meet the access probability, determine that the base station may not be accessed through the second terminal.

In at least one embodiment, the state of the second terminal includes electricity amount of load of the second terminal, and the communication unit 420 is specifically configured to: determine the electricity amount or load of the second terminal according to the indication information; when the electricity amount is larger than a preset electricity amount threshold value or the load of the second terminal is larger than a preset load threshold value, determine that the base station may be accessed through the second terminal; and when the electricity amount of the second terminal is smaller than the electricity amount threshold value or the load of the second terminal is smaller than the load threshold value, determine that the base station may not be accessed through the second terminal.

In at least one embodiment, the indication information is included in DCI of a PHY layer of the discovery layer.

In at least one embodiment, the indication information is included in a MAC CE of the discovery signal.

In at least one embodiment, the indication information is included in a ProSe protocol layer of the discovery signal.

Figure 5:
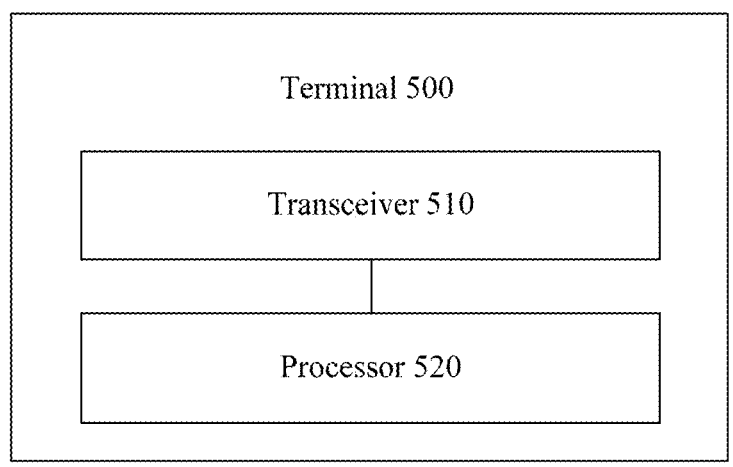
FIG. 5 is a schematic structure diagram of a terminal according to an embodiment of the disclosure.

FIG. 5 is a schematic structure diagram of a terminal according to an embodiment of the disclosure. The terminal 500 of FIG. 5 includes:

a transceiver 510, configured to receive a discovery signal of a second terminal, the discovery signal including indication information and the indication information being configured to indicate a capability of the second terminal and/or a state of the second terminal; and a processor 520, configured to perform D2D communication with the second terminal through the transceiver 510 according to the indication information.

According to the embodiment of the disclosure, D2D communication is performed on the basis of a capability and/or state of a terminal, so that flexibility of a D2D communication manner is improved.

In at least one embodiment, the second terminal accesses a base station through a first terminal, the indication information is configured to indicate the capability of the second terminal, and the processor 520 is specifically configured to determine a communication manner matched with the capability of the second terminal according to the indication information and during the second terminal accessing the base station through the first terminal, perform D2D communication with the second terminal in the communication manner.

In at least one embodiment, the indication information is specifically configured to indicate a capability level of the second terminal, the capability level of the second terminal is one of multiple preset capability levels, and the processor 520 is specifically configured to determine the capability level of the second terminal according to the indication information, determine the capability of the second terminal through a preset correspondence between capability levels and capabilities of a terminal according to the capability level of the second terminal and determine the communication manner matched with the capability of the second terminal.

In at least one embodiment, the capability of the second terminal includes at least one of a bandwidth supported by the second terminal and transmit power of the second terminal.

In at least one embodiment, the first terminal accesses the base station through the second terminal, the indication information is configured to indicate the state of the second terminal, and the processor 520 is specifically configured to determine the state of the second terminal according to the indication information, determine whether the base station may be accessed through the second terminal according to the state of the second terminal and, responsive to a determination about that the base station may be accessed through the second terminal, perform, by the first terminal, D2D communication with the second terminal to access the base station.

In at least one embodiment, the indication information is specifically configured to indicate a state level of the second terminal, the state level of the second terminal is one of multiple preset state levels, and the processor 520 is specifically configured to determine the state level of the second terminal according to the indication information and determine the state of the second terminal through a preset correspondence between state levels and states of a terminal according to the state level of the second terminal.

In at least one embodiment, the indication information is specifically configured to indicate whether the second terminal allows another terminal to access the base station through the second terminal.

In at least one embodiment, the processor 520 is specifically configured to: determine a service type set or terminal set for which the second terminal allows the other terminal to access the base station through the second terminal according to the indication information; determine whether a service type of a present service of the first terminal belongs to the service type set or whether the first terminal belongs to the terminal set; when the service type of the present service belongs to the service type set or the first terminal belongs to the terminal set, determine that the base station may be accessed through the second terminal; and when the service type of the present service does not belong to the service type set or the first terminal does not belong to the terminal set, determine that the base station may not be accessed through the second terminal.

In at least one embodiment, the processor 520 is specifically configured to: determine an access probability of the present service of the first terminal or a terminal category of the first terminal; generate a random number and calculate a probability of the random number; when the probability of the random number meets the access probability, determine that the base station may be accessed through the second terminal; and when the probability of the random number does not meet the access probability, determine that the base station may not be accessed through the second terminal.

In at least one embodiment, the state of the second terminal includes electricity amount and load of the second terminal, and the processor 520 is specifically configured to: determine the electricity amount or load of the second terminal according to the indication information; when the electricity amount is larger than a preset electricity amount threshold value or the load of the second terminal is larger than a preset load threshold value, determine that the base station may be accessed through the second terminal; and when the electricity amount is smaller than the electricity amount threshold value or the load of the second terminal is smaller than the load threshold value, determine that the base station may not be accessed through the second terminal.

In at least one embodiment, the indication information is included in DCI of a PHY layer of the discovery layer.

In at least one embodiment, the indication information is included in a MAC CE of the discovery signal.

In at least one embodiment, the indication information is included in a ProSe protocol layer of the discovery signal.

Term "and/or" in the disclosure represent that there may exist three relationships. For example, A and/or B may represent three conditions, that is, only A exists, both A and B exist and only B exists. In addition, character "/" in the disclosure usually represents that front and rear associated objects form an "or" relationship.

Those of ordinary skilled in the art may realize that the units and algorithm actions of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the actions of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A Device to Device (D2D)-based communication method, comprising:
receiving, by a first terminal, a discovery signal of a second terminal, wherein the discovery signal comprises indication information and the indication information is configured to indicate a capability of the second terminal or indicate the capability of the second terminal and a state of the second terminal;
performing, by the first terminal, D2D communication with the second terminal according to the indication information;
wherein the second terminal accesses a base station through the first terminal, and
performing, by the first terminal, D2D communication with the second terminal according to the indication information, comprises:
determining, by the first terminal, a communication manner matched with the capability of the second terminal according to the indication information; and
during the second terminal accessing the base station through the first terminal, performing, by the first terminal, D2D communication with the second terminal in the communication manner;
wherein the indication information is configured to indicate a capability level of the second terminal, the capability level of the second terminal is one of a plurality of preset capability levels, and
determining, by the first terminal, the communication manner matched with the capability of the second terminal according to the indication information comprises:
determining, by the first terminal, the capability level of the second terminal according to the indication information;
determining, by the first terminal, the capability of the second terminal through a preset correspondence between capability levels and capabilities of a terminal according to the capability level of the second terminal; and
determining, by the first terminal, the communication manner matched with the capability of the second terminal.

2. The method according to claim 1, wherein when the indication information indicates the capability of the second terminal and the state of the second terminal, the state of the second terminal comprises an electricity amount or load of the second terminal and the method further comprises:
determining, by the first terminal, the electricity amount or load of the second terminal according to the indication information;
determining, by the first terminal, whether the base station can be accessed through the second terminal according to the electricity amount or load of the second terminal;
performing, by the first terminal, D2D communication with the second terminal according to the state of the second terminal;
wherein determining, by the first terminal, whether the base station can be accessed through the second terminal according to the electricity amount or load of the second terminal comprises:
when the electricity amount of the second terminal is larger than a preset electricity amount threshold value or the load of the second terminal is larger than a preset load threshold value, determining, by the first terminal, that the base station can be accessed through the second terminal; and
when the electricity amount of the second terminal is smaller than the electricity amount threshold value or the load of the second terminal is smaller than the load threshold value, determining, by the first terminal, that the base station cannot be accessed through the second terminal.

3. The method according to claim 2, wherein performing, by the first terminal, D2D communication with the second terminal according to the state of the second terminal comprises:
when the first terminal determines that the base station can be accessed through the second terminal, performing, by the first terminal, D2D communication with the second terminal to access the base station.

4. The method according to claim 1, wherein the indication information is further configured to indicate whether the second terminal allows another terminal to access the base station through the second terminal.

5. The method according to claim 1, wherein the method further comprises:
generating, by the first terminal, a random number, and calculating a probability of the random number;
when the probability of the random number meets the access probability, determining, by the first terminal, that the base station can be accessed through the second terminal; and
when the probability of the random number does not meet the access probability, determining, by the first terminal, that the base station cannot be accessed through the second terminal.

6. The method according to claim 1, wherein the indication information is further configured to indicate that a service type set or terminal set for which the second terminal allows one or more terminals other than the second terminal to access the base station through the second terminal.

7. The method according to claim 6, wherein the method further comprises:
determining, by the first terminal, whether a service type of a present service of the first terminal belongs to the service type set, or whether the first terminal belongs to the terminal set;
when the service type of the present service belongs to the service type set or the first terminal belongs to the terminal set, determining, by the first terminal, that the base station can be accessed through the second terminal; and
when the service type of the present service does not belong to the service type set or the first terminal does not belong to the terminal set, determining, by the first terminal, that the base station cannot be accessed through the second terminal.

8. The terminal according to claim 1, wherein the indication information is comprised in Downlink Control Information (DCI) of a Physical (PHY) layer of the discovery layer.

9. The terminal according to claim 1, wherein the indication information is comprised in a Media Access Control (MAC) Control Element (CE) of the discovery signal.

10. The terminal according to claim 1, wherein the indication information is comprised in a Proximity-based Service (ProSe) protocol layer of the discovery signal.

11. The method according to claim 1, wherein the capability of the second terminal comprises at least one of a bandwidth supported by the second terminal or transmit power of the second terminal.

12. A terminal, which is a first D2D-based communication terminal, the terminal comprising:
   a transceiver, configured to receive a discovery signal of a second terminal, wherein the discovery signal comprises indication information and the indication information is configured to indicate a capability of the second terminal or indicate the capability of the second terminal and a state of the second terminal; and
   a processor, configured to perform D2D communication with the second terminal according to the indication information;
   wherein the second terminal accesses a base station through the first terminal, and
   the processor is specifically configured to determine a communication manner matched with the capability of the second terminal according to the indication information, and during the second terminal accessing the base station through the first terminal, perform D2D communication with the second terminal in the communication manner;
   wherein the indication information is configured to indicate a capability level of the second terminal, the capability level of the second terminal is one of a plurality of preset capability levels, and
   the processor is specifically configured to determine the capability level of the second terminal according to the indication information, determine the capability of the second terminal through a preset correspondence between capability levels and capabilities of a terminal according to the capability level of the second terminal, and determine the communication manner matched with the capability of the second terminal.

13. The terminal according to claim 12, wherein when the indication information indicate the capability of the second terminal and the state of the second terminal, the state of the second terminal comprises an electricity amount or load of the second terminal and the processor is specifically configured to:
   determine that the electricity amount or load of the second terminal according to the indication information,
   determine that whether the base station can be accessed through the second terminal according to the electricity amount or load of the second terminal,
   perform D2D communication with the second terminal according to the state of the second terminal,
   determine that the base station can be accessed through the second terminal when the electricity amount of the second terminal is larger than a preset electricity amount threshold value or the load of the second terminal is larger than a preset load threshold value, and
   determine that the base station cannot be accessed through the second terminal when the electricity amount of the second terminal is smaller than the electricity amount threshold value or the load of the second terminal is smaller than the load threshold value.

14. The terminal according to claim 12, wherein the processor is further configured to, when determining that the base station can be accessed through the second terminal, perform D2D communication with the second terminal to access the base station.

15. The terminal according to claim 12, wherein the indication information is further configured to indicate whether the second terminal allows another terminal to access the base station through the second terminal.

16. The terminal according to claim 12, wherein the indication information is further configured to indicate that a service type set or terminal set for which the second terminal allows one or more terminals other than the second terminal to access the base station through the second terminal.

17. The terminal according to claim 16, wherein the processor is further configured to determine whether a service type of a present service of the first terminal belongs to the service type set or whether the first terminal belongs to the terminal set; when the service type of the present service belongs to the service type set or the first terminal belongs to the terminal set, determine that the base station can be accessed through the second terminal; and when the service type of the present service does not belong to the service type set or the first terminal does not belong to the terminal set, determine that the base station cannot be accessed through the second terminal.

18. The terminal according to claim 12, wherein the processor is further configured to: generate a random number and calculate a probability of the random number; when the probability of the random number meets the access probability, determine that the base station can be accessed through the second terminal; and when the probability of the random number does not meet the access probability, determine that the base station cannot be accessed through the second terminal.

19. The terminal according to claim 12, wherein the indication information is comprised in Downlink Control Information (DCI) of a Physical (PHY) layer of the discovery layer, a Media Access Control (MAC) Control Element (CE) of the discovery signal or a Proximity-based Service (ProSe) protocol layer of the discovery signal.

* * * * *